United States Patent
McClanahan et al.

(10) Patent No.: US 8,056,098 B2
(45) Date of Patent: Nov. 8, 2011

(54) LINEUP DETECTION

(75) Inventors: Joseph McClanahan, Redmond, WA (US); Mark Schwesinger, Bellevue, WA (US); Jessica Zahn, Renton, WA (US); Cory Cirrincione, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 772 days.

(21) Appl. No.: 12/098,356

(22) Filed: Apr. 4, 2008

(65) Prior Publication Data
US 2009/0254941 A1    Oct. 8, 2009

(51) Int. Cl.
*G06F 3/00* (2006.01)
*G06F 13/00* (2006.01)
*H04N 5/445* (2006.01)
*H04N 5/50* (2006.01)

(52) U.S. Cl. .................... 725/37; 725/38; 348/732
(58) Field of Classification Search .................. 725/35
See application file for complete search history.

(56) References Cited

U.S. PATENT DOCUMENTS

| | | | |
|---|---|---|---|
| 6,119,124 A * | 9/2000 | Broder et al. ................ | 1/1 |
| 6,388,714 B1 | 5/2002 | Schein | |
| 6,981,273 B1 | 12/2005 | Domegan | |
| 7,647,605 B2 * | 1/2010 | Lu et al. ..................... | 725/20 |
| 7,818,767 B2 * | 10/2010 | Domegan et al. ............ | 725/39 |
| 2002/0186296 A1 | 12/2002 | Gogoi | |
| 2004/0001081 A1 | 1/2004 | Marsh | |
| 2005/0028206 A1 | 2/2005 | Cameron | |
| 2005/0278737 A1 | 12/2005 | Ma | |
| 2006/0130098 A1 | 6/2006 | Rao | |
| 2006/0248556 A1 * | 11/2006 | Yuen et al. ................... | 725/35 |
| 2008/0126297 A1 * | 5/2008 | Rowley ....................... | 707/2 |

FOREIGN PATENT DOCUMENTS

| | | |
|---|---|---|
| WO | 9627982 | 9/1996 |
| WO | WO 9627982 A1 * | 9/1996 |
| WO | 0040017 | 7/2000 |
| WO | 2006126988 | 11/2006 |

OTHER PUBLICATIONS

LineUp Electronic Programming Guide http://www.displaysystemsintl.com/Pages/lineup.htm.
2. Electronic Program Guide http://msdn2.microsoft.com/en-us/library/bb189103(printer).aspx.

* cited by examiner

*Primary Examiner* — Justin Shepard
(74) *Attorney, Agent, or Firm* — Vierra Magen Marcus & DeNiro LLP

(57) ABSTRACT

The technology is a system and method for selecting a television lineup. The available television lineups capable of being viewed on a digital device are identified. One of the tuner positions is selected and the television channel designated in each available television lineup identified. If any of the television channels identified is a likely identifiable channel and is designated by approximately half of the available television lineups, available television lineups may be deleted based on the television signal received by the selected tuner position. In on embodiment, the tuner positions are selected in numerical order. In an alternative embodiment, the tuner positions are first sorted before one is selected. It may not be possible to delete lineups based on likely identifiable channels. In this case, a viewer may be prompted to identify a channel.

20 Claims, 7 Drawing Sheets

LINEUP DETECTION

BACKGROUND

An Electronic Program Guide (EPG), which is also commonly referred to as an Interactive Program Guide (IPG) is an on-screen guide to scheduled broadcast television. An EPG allowing a viewer to navigate, select, and discover content by time, title, channel, genre, etc., by use of their remote control. The technology is based upon broadcasting data to an application usually residing within middleware in a set-top box that connects to a television set and enables the application to be displayed.

Choosing the right EPG is a difficult, time-consuming process for viewers. There are often many different EPG lineups (also referred to as a "television lineup") for a given postal code. Viewers do not know which EPG will give them the exact lineup they have and often do not have the information they need to make the right choice.

EPG lineups do not map to postal codes. EPG lineups map to geographical regions and are often not named in a way a viewer will understand. For example, a viewer that lives in Renton, Wash. (zip code 98059) and receives television through a cable system may choose between three different Comcast television lineups. Each television lineup includes a different headend: Renton, South King County and Seattle. A viewer likely has no idea which television lineup to chose.

SUMMARY

One aspect of the present technology is to select a television lineup for a viewer's digital device. In a locale where more than one television lineup may be available to select within a geographical region, the technology selects only the television lineup that accurately reflects the lineup received by the digital device. All available television lineups are initially identified. Each television lineup includes multiple tuner positions each designating a television channel. The television channel designated by each available television lineup is identified for a selected tuner position. If one of the designated television channels is a likely identifiable channel and that likely identifiable channel is designated in approximately half of the available television lineups, the available television lineups will be narrowed down based on the selected tuner position.

The signal received by the selected tuner position is identified. If the signal received by the selected tuner position is identified as the same likely identifiable channel, each available television lineup that does not designate the likely identifiable channel on the selected tuner position is deleted. If the signal received by the selected tuner position is not the same likely identifiable channel, each available lineup that designates the likely identifiable channel on the selected tuner position is deleted. This process is repeated until one available television lineup remains.

In another embodiment, after all the available television lineups are identified, the differences between the available television lineups are identified by tuner position. The tuner positions are sorted according to a sorting algorithm using a comparison metric, forming a list of tuner positions. The comparison metric allows the sorter to compare tuner positions based on whether a television lineup designates a likely identifiable channel and the percentage of television lineups that designate the same likely identifiable channel. The first tuner position in the list is selected and the channel received on the selected tuner position is identified. Television lineups may then be eliminated based on the channel received by the selected tuner position.

Sometimes television lineups cannot be eliminated based on likely identifiable channels. In this case, the viewer may be prompted and asked to identify a specific channel. A user interface streams video from the selected tuner position in a display window and ask the viewer to confirm that the video is associated with a certain television channel. If the viewer confirms the channel is being displayed in the window, at least one television lineup that does not designate the channel may be deleted. If the viewer confirms that the video is associated with another channel, television lineups that designate the channel are deleted. If the viewer cannot identify the channel associated with the video being displayed, another tuner position is selected and video from the new tuner position is streamed in the window. This process is repeated until the viewer identifies a channel. After deleting television lineups based on the viewer's feedback, the remaining television lineups are further narrowed as described above.

DETAILED DESCRIPTION

The technology described herein selects a single television lineup from multiple available television lineups and downloads the selected television lineup on a digital device. It is common for more than one television lineup to be available within a single postal code transmitted from a single signal type (e.g., cable television). Yet only one of television lineups matches the lineup actually received on the viewer's digital device. The differences between the television lineups are identified for each tuner position and as close to half of the television lineups are eliminated each time based on the presence or absence of likely identifiable channels until a single television lineup remains. The remaining television lineup is downloaded onto the digital device.

Figure 1:
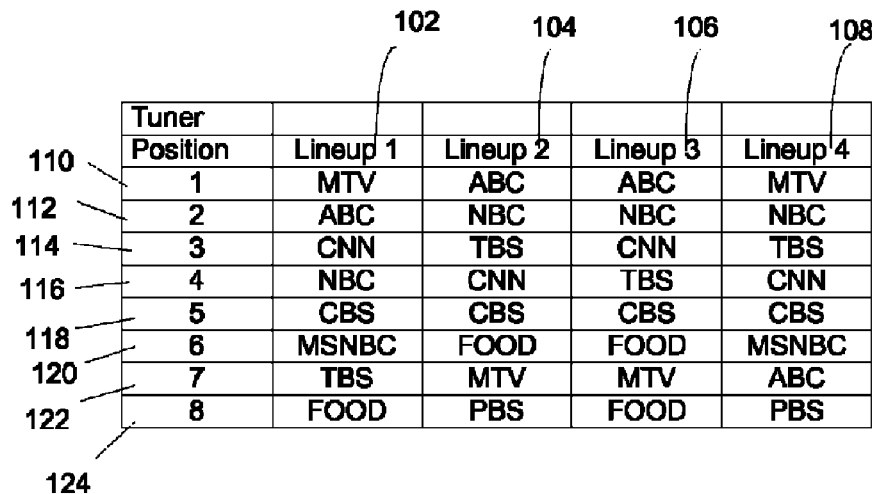
FIG. 1 depicts exemplary available lineups.

FIG. 1 provides an example of four available television lineups: a first television lineup 102, a second television lineup 104, a third television lineup 106 and a fourth television lineup 108. A viewer, if they attempted to manually select a television lineup, would have to choose between four different television lineups. Each lineup shown in FIG. 1 identifies eight different tuner positions: a first tuner position 110, a second tuner position 112, a third tuner position 114, a fourth tuner position 116, a fifth tuner position 118, a sixth tuner position 120, a seventh tuner position 122 and an eighth tuner position 124. Each television lineup designates a television channel for each tuner position.

The first television lineup 102 designates the Music Television channel (MTV) for the first tuner position 110, the American Broadcasting Company (ABC) channel for the second tuner position 112, the Cable New Network (CNN) channel for the third tuner position 114, the National Broadcasting Company (NBC) channel for the fourth tuner position 116, the Columbia Broadcasting System (CBS) channel for the fifth tuner position 118, the Microsoft-NBC (MSNBC) channel for sixth tuner position 120, the Turner Broadcasting System (TBS) channel for the seventh tuner position 122 and the Food Network (FOOD) channel for the eighth tuner position 124. The second television lineup 104 designates ABC for the first tuner position 110, NBC for the second tuner position 112, TBS for the third tuner position 114, CNN for the fourth tuner position 116, CBS for the fifth tuner position 118, FOOD for the sixth tuner position 120, MTV for the seventh tuner position 122 and the Public Broadcasting Service (PBS) channel for the eighth tuner position 124.

The third television lineup 106 designates ABC for the first tuner position 110, NBC for the second tuner position 112, CNN for the third tuner position 114, TBS for the fourth tuner position 116, CBS for the fifth tuner position 118, FOOD for the sixth tuner position 120, MTV for the seventh tuner position 122 and FOOD for the eighth tuner position 124. The fourth television lineup 108 designates MTV for the first tuner position 110, NBC for the second tuner position 112, TBS for the third tuner position 114, CNN for the fourth tuner position 116, CBS for the fifth tuner position 118, MSNBC for the sixth tuner position 120, ABC for the seventh tuner position 122 and PBS for the eighth tuner position 124.

As can be seen in FIG. 1, the four available television lineups 102-108 each provide a different list of channels. The accuracy of the EPG downloaded to the viewer's digital device (e.g., television, set-top box, personal computer, etc.) is important to the viewer. It is inconvenient if the viewer selects a channel in the EPG and a different channel appears on the television. For example, if the channels designated in the first television lineup 102 correctly match the signals received on each television tuner position, the viewer expects to watch a program on MTV when the viewer selects the first tuner position 110 in the EPG. If the viewer selected the second television lineup 104 as the EPG, the viewer would expect to view a program on ABC when selecting the first tuner position 110. However, the viewer still ends up viewing a program on MTV. It is also important for recording shows if the viewer uses the EPG to select television programs to record. The viewer expects the digital device to record the television selected on the EPG.

Figure 2:
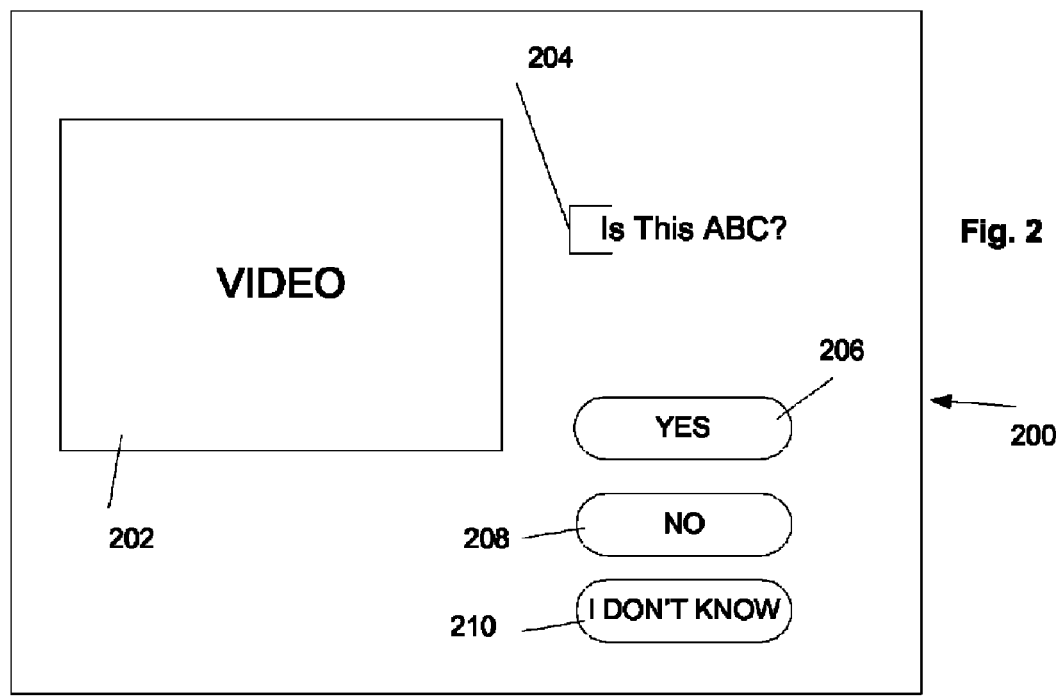
FIG. 2 depicts an exemplary user interface for prompting a viewer to identify a television channel.

FIG. 2 illustrates an exemplary user interface for prompting a viewer to identify a television channel. The user interface 200 includes a display window 202, a question display 204, a YES button 206, a NO button 208 and an I DON'T KNOW button 210. The format of the user interface 200 is not limited to that shown in FIG. 2. More details about the user interface 200 will be provided later.

Figure 3:
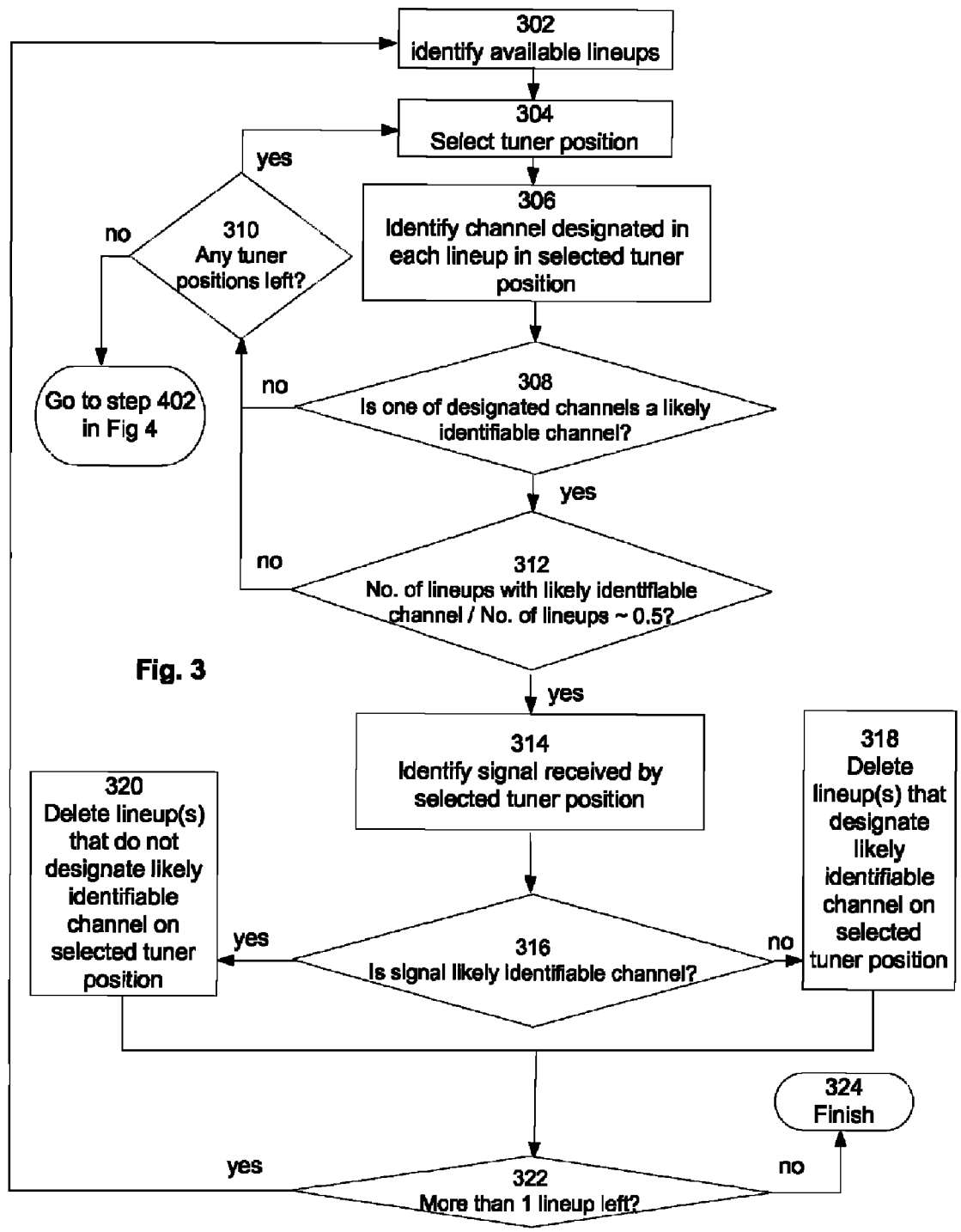
FIG. 3 depicts a flow diagram providing exemplary steps for selecting the appropriate television lineup.

FIG. 3 illustrates a flow diagram displaying exemplary steps for selecting a television lineup for downloading onto a digital device. The four available television lineups shown in FIG. 1 will be referenced throughout this application to describe the steps shown in FIG. 3. In step 302, available television lineups are identified. If the digital device is configured to receive cable television signals, available television lineups are identified by cable television headends. Using the example provided above in FIG. 1, four available television lineups are identified in step 302: the first television lineup 102, the second television lineup 104, the third television lineup 106 and the fourth television lineup 108.

In step 304, a tuner position is selected. Any tuner position may be selected to begin the comparison between television lineups. For the purpose of describing this technology only, the first tuner position 110 is selected, in step 304. In step 306, the channel designated by each available television lineup for the first tuner position 110 is identified. The first television lineup 102 designates MTV, the second television lineup 104 designates ABC, the third television lineup 106 designates ABC and the fourth television lineup 108 designates MTV. The first television lineup 102 and the fourth television lineup 108 designate the same channel, MTV. The second television lineup 104 and the third television lineup 106 designate the same television channel, ABC. Thus, the EPG that matches the signals received by the digital device will either designate MTV or ABC for the first tuner position 110.

In step 308, it is determined whether any of the channels designated by the four television lineups on the first tuner position 110 is a likely identifiable channel. A likely identifiable channel comprises a channel that typically contains the same in-band data regardless of geographical region. Many nationally broadcast channels such as MTV and TBS contain in-band data. In one embodiment, these likely identifiable channels are stored in the memory of the digital product (e.g., television, set-top box, personal computer). In an alternative embodiment, these likely identifiable channels are downloaded to the digital device upon initial setup. It is also within the scope of the technology to download newly identified channels that carry in-band data. For the purpose of describing this technology only, MTV and TBS comprise likely identifiable channels, which are channels that likely contain, by way of example only, a Broadcast Audio Code transmitted during broadcast of the channel. If MTV or TBS was not designated by any of the four television lineups, it is determined whether any other tuner positions are available to select, in step 310. However, the first television lineup 102 and the fourth television lineup 108 designate MTV in the first tuner position 110.

In step 308, two of the designated channels are identified as a likely identifiable channel. In step 312, the number of television lineups that designate MTV are identified. In the FIG. 1 example, two television lineups (first and fourth) designate MTV for the first tuner position 110. The percentage of television lineups that designate MTV for the first tuner position 110 is then calculated. In the example provided above, two out of four television lineups, or fifty percent, of the available television lineups designate MTV for the first tuner position 110.

In one embodiment, the method attempts to reduce the number of available television lineups to as close to half as possible each time lineups are eliminated based in likely identifiable channels. Thus, in step 312, the number of television lineups that designate a likely identifiable channel for a particular tuner position should comprise approximately 50% of the total number of television lineups in order to continue to step 314. In an alternative embodiment, the number of television lineups that designate a likely identifiable channel for a particular tuner position may vary between 40%-60% of the total number of television lineups in order to continue to step 314. By way of example only, if five total available television lineups were identified in step 302, it would not be possible for 50% of the total number of available television lineups to designate a likely identifiable channel. If two out of five available television lineups designated a likely identifiable channel, the percentage calculated in step 312 would be 40%. If three out of five available television lineups designated a likely identifiable channel, the percent calculated in step 312 would be 60%. Thus, a range of acceptable percentages is within the scope of the technology. If there is not an acceptable percentage of television lineups, an another tuner position is left to select (step 310), another tuner position is selected, in step 304.

In step 314, the signal received by the first tuner position 110 is identified. In step 316, the signal received by the first tuner position 110 is compared to the likely identifiable channel designated in the first television lineup 102 and the fourth television lineup 108, MTV. If the signal received by the first tuner position 110 is not MTV, the available television lineups that designate MTV on the first tuner position 110 are deleted, in step 318. If the channel received by the first tuner position 110 is MTV, the available television lineups that do not designate MTV are deleted, in step 320. For the purpose of describing this technology only, the signal received by the first tuner position 110 is MTV. Thus, in step 316, it is determined that the channel received by the first tuner position 110, MTV, is the same as the likely identifiable channel designated by the available television lineups. In step 320, the available television lineups that do not designate MTV on the first tuner position 110 are eliminated as possible choices. Accordingly, the second television lineup 104 (which designates ABC) and the third television lineup 106 (which designates ABC) are eliminated, in step 320.

Two available television lineups remain at this point: the first television lineup 102 and the fourth television lineup 108. In step 322, it is determined that more than one available television lineup remains and continues to step 302. If only a single television lineup remained, the remaining television lineup is downloaded to a digital device (e.g., set-top box, personal computer, television, etc.), in step 324.

In step 302, the first television lineup 102 and fourth television lineup 108 is identified. In step 304, a tuner position is selected. In the first instance of step 304, the first tuner position 110 was selected. The same tuner position is not selected for comparing the remaining television lineups. In one embodiment, each subsequent instance of step 304 selects the next available tuner position. Accordingly, the second instance of step 304 selects the second tuner position 112. In an alternative embodiment, the tuner positions are randomly selected in step 304.

In step 306, the channel designated by each available television lineup for the second tuner position 112 is identified. The first television lineup 102 designates ABC for the second tuner position 112 and the fourth television lineup 108 designates NBC for the second tuner position 112. In step 308, it is determined neither ABC nor NBC is a likely identifiable channel. In step 310, it is determined that additional tuner positions exist in the first and fourth television lineups that have yet to be selected. In the third instance of step 304, the third tuner position 114 is selected. The first television lineup 102 designates CNN for the third tuner position 114. The fourth television lineup 108 designates TBS for the third tuner position 114.

In step 308, it is determined that TBS is a likely identifiable channel. In step 312, it is determined that the number of television lineups that designate TBS (fourth television lineup 108) is 50% of the total number of television lineups (two television lineups remain: the first and fourth lineups). In step 314, the signal received by the third tuner position 114 is identified. For the purpose of describing this technology, the signal received by the third tuner position 114 is identified as TBS, in step 314. In step 316, it is determined that the signal received by the third tuner position 114, TBS, matches the likely identifiable channel designated in the fourth television lineup 108. Thus, the first television lineup 102 is deleted, in step 320. In step 322, it is determined that only the fourth television lineup 108 remains. Thus, the fourth television lineup 108 is downloaded to the digital device, in step 324.

It may not be possible to narrow the available television lineups to a single television lineup based solely on the likely identifiable channels because the remaining television lineups may designate the same likely identifiable channel on all the same tuner positions. Thus, a television lineup cannot be eliminated based on channel differences for the same tuner position. In this case, the viewer may be prompted to identify a channel. In FIG. 3, if more than one television lineup still remains and all the tuner positions have been compared the user is prompted.

Figure 4:
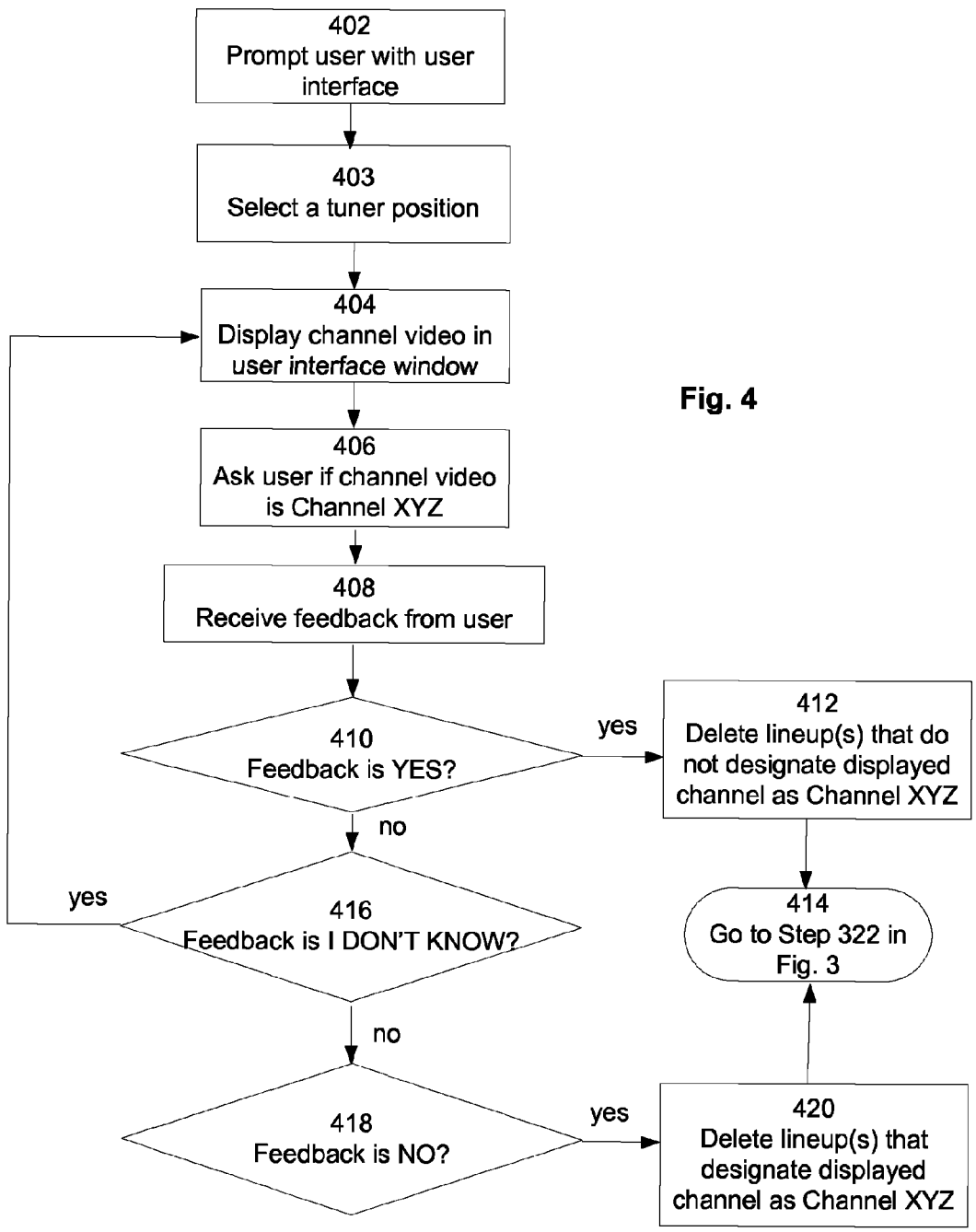
FIG. 4 depicts a flow diagram providing exemplary steps for selecting a television channel using the user interface shown in FIG. 2.

FIG. 4 illustrates exemplary steps of prompting the viewer to identify a television channel. Using the example provided in FIG. 1, suppose that the first television lineup 102 and the fourth television lineup 108 remain and one of the television lineups cannot be eliminated using likely identifiable channels. In step 402, a user interface prompts the viewer. An exemplary user interface 200 is shown in FIG. 2. The user interface 200 may be displayed via the digital device. If the user interface 200 on a television screen, the viewer may navigate the user interface 200 with, for example, a remote control. If the user interface 200 is displayed through a computer screen, the viewer may navigate the user interface with, for example, a mouse.

In step 403, a tuner position is selected in which the first television lineup 102 and the fourth television lineup 108 designate different channels. In FIG. 1, the first television lineup 102 designates ABC and the fourth television lineup 108 designates NBC for the second tuner position 112. If the viewer can confirm that either ABC or NBC is broadcast on the second tuner position 112, one of the remaining television lineups can be eliminated. In step 403, the second tuner position 112 is selected. In step 404, the signal received on the second tuner position 112 is displayed in window 602.

In step 406, a question 204 is presented to the viewer asking the viewer to confirm if the video displayed in the window 202 is associated with a specific channel. Using the FIG. 1 example, it is likely that the signal received by the second tuner position 112 is associated with either ABC or NBC. In one embodiment, the viewer is asked whether the video being displayed in window 202 is ABC. In an alternative embodiment, the viewer is asked whether the video being displayed in the window 202 is NBC. For the purpose of describing this technology only, the signal received by the second tuner position 112 is ABC.

The channel associated with the video displayed in the window 202 may be identified in many different ways. Television broadcasts often display a channel logo in a section of the screen during programming, certain television programs air only on a specific channel (e.g., "Good Morning America" always airs on ABC, "Larry King" always airs on CNN, etc.) and networks provide intermittent station identifications. These are all visual indicators that the viewer may be able to identify. Other visual indicators may be confirmed by the viewer.

In step 408, feedback from the viewer is received. In the user interface 200 shown in FIG. 2, the viewer can select one of three buttons in response to the question 204: a YES button 206, a NO button 208, and an I DON'T KNOW button 210. If the viewer can identify that the channel is ABC, the viewer selects the YES button 606. If the viewer can identify that the channel is a channel other than ABC (e.g., an NBC logo is being displayed), the viewer chooses the NO button 208. If the viewer cannot identify the channel at all (e.g., no network logo, station identification, etc.), the viewer chooses the I DON'T KNOW button 210.

If the viewer selects the YES button 206 (indicating that the television channel being displayed in window 202 is ABC), the fourth television lineup 108 is deleted because it designates NBC in the second tuner position 112, in step 412. If the viewer selects the NO button 208 (indicating that the television channel being displayed in window 602 is a channel other than ABC), the first television lineup 102 is deleted because it designates ABC on the second tuner position 112, in step 420. After a television channel is identified by the viewer, allowing at least one television lineup to be deleted (steps 412 or 420), the user interface 200 is no longer displayed. It is then determined if more than one television lineup remains, in step 322.

If the viewer selects the I DON'T KNOW 210 (indicating that the viewer cannot identify the channel being shown), neither the first television lineup 102 nor the fourth television lineup 108 may be deleted. In this case, a different tuner position is selected, in step 403. Any tuner position may be selected as long as all the television lineups do not designate the same channel for the selected tuner position. Using the FIG. 1 example, the third tuner position 114 is selected, in step 403. In step 404, the signal received by the third tuner position 114 is streamed in the window 202. For the purpose of describing this technology only, the signal received by the third tuner position 114 is associated with CNN. In step 406, the question "Is this CNN" is displayed in the user interface.

In step 408, feedback from the viewer is received. If the viewer can identify that the channel displayed in the window 202 is CNN, the viewer selects the YES button 206. If the viewer can identify that the channel displayed in the window 202 is a channel other than CNN (e.g., a TBS logo is displayed in the screen), the viewer chooses the NO button 208. If the viewer cannot identify the channel displayed in the window 202 at all (e.g., no network logo, station identification, etc.), the viewer chooses the I DON'T KNOW button 210. This process is repeated until the viewer can identify a television channel and selects either the YES button 206 or the NO button 208.

The intention of the technology is to eliminate as close to half of the total available television lineups every time. This way, a maximum number of available television lineups are eliminated each time and the total number of available television lineups is quickly reduced to a single television lineup. Using the example provided in FIG. 1, as discussed above, half of the four available television lineups were eliminated. And then if half of the remaining two available television lineups could be eliminated as a result of performing the method 300 a second time, a single available television lineup could be selected after performing the method 300 only two times.

Figure 5:
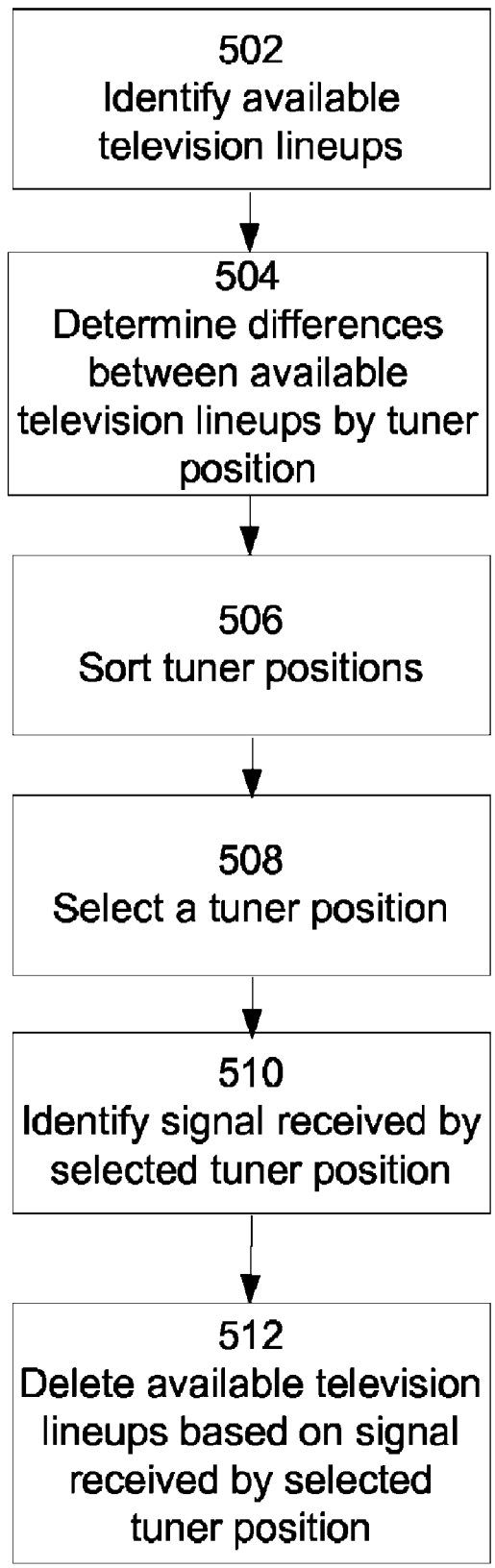
FIG. 5 depicts a flow diagram providing exemplary steps of another embodiment for selecting a television lineup.

FIG. 5 illustrates another flow diagram providing exemplary steps for selecting a television lineup. The example provided in FIG. 1 will be referenced to describe the steps shown in FIG. 5. In step 502, the four available television lineups are identified: the first television lineup 102, the second television lineup 104, the third television lineup 106 and the fourth television lineup 108.

In step 504, the differences between the four available television lineups are determined for each tuner position. The four available television lineups each include eight tuner positions. The channel designated by each television lineups is identified. For the first tuner position 110, the first television lineup 102 designates MTV, the second television lineup 104 designates ABC, the third television lineup 106 designates ABC and the fourth television lineup 108 designates MTV. It is determined that the first television lineup 102 and the fourth television lineup each designate a likely identifiable channel, MTV, for the first tuner position 110. If at least one television lineup designates a likely identifiable channel, the percentage of television lineups that designate the same likely identifiable channel for the first tuner position 110 is also calculated. For the first tuner position 110, it is also calculated that fifty-percent of the television lineups designate MTV for the first tuner position 110.

For the second tuner position 112, the first television lineup 102 designates ABC, the second television lineup 104 designates NBC, the third television lineup 106 designates NBC and the fourth television lineup 108 designates NBC. It is determined that none of the television lineups designate a likely identifiable channel.

For the third tuner position 114, the first television lineup 102 designates CNN, the second television lineup 104 designates TBS, the third television lineup 106 designates CNN and the fourth television lineup 108 designates TBS. It is determined that the second television lineup 104 and the fourth television lineup 108 each designate a likely identifiable channel, TBS, for the third tuner position 114. For the third tuner position 114, it is also calculated that fifty-percent of the television lineups designate TBS for the third tuner position 114.

For the fourth tuner position 116, the first television lineup 102 designates NBC, the second television lineup 104 designates CNN, the third television lineup 106 designates TBS and the fourth television lineup 108 designates CNN. It is determined that the third television lineup 106 designates a likely identifiable channel, TBS, for the fourth tuner position 116. It is also calculated that twenty-five percent of the television lineups designate TBS for the fourth tuner position 116. This process is repeated for all eight tuner positions.

In step 506, the tuner positions are sorted. By way of example only, a comparison operator may be used by a sorting algorithm to compare two tuner positions at a time to indicate which tuner position is preferable or whether the two tuner positions are equal. A sorting algorithm may comprise, by way of example only, quicksort, merge sort, bubble sort, and the like. Such sorting algorithms are well known within the computer science art and therefore, additional disclosure is not required. When the sorting algorithm is done, the tuner positions will be sorted in order. Each tuner position is either more preferable or equally preferable to the tuner position after it in the list. Using the example provided in FIG. 1 above, the sorting algorithm uses the comparison operator to compare the eight tuner positions. By way of example only, the comparison operator includes the following defining properties:

(1) Is either tuner position more preferable based on likely identifiable channel?-> That one is preferable.

(2) Does either tuner position have as close as possible to half the available television lineups designating the same likely identifiable channel?-> That one is preferable.

The result of the sorting algorithm is that the tuner positions are sorted in the following order: first tuner position 110, third tuner position 114, seventh tuner position 122, second tuner position 112, fourth tuner position 116, fifth tuner position 118, sixth tuner position 120 and eighth tuner position 124. The first tuner position 110 is first in the list of tuner positions because two television lineups designate a likely identifiable channel, MTV, and half of the total number of television lineups designate MTV. The third tuner position 114 is second in the list of tuner position because two television lineup designate a likely identifiable channel, TBS, and half of the total number of television lineups designate TBS. The seventh tuner position 120 is third in the list of tuner positions because one television lineup designates a likely identifiable channel, TBS, and one quarter of the total number of lineups designates TBS. The rest of the tuner positions do not have a television lineup that designates either MTV or TBS. Thus, the second, fourth fifth, sixth and eighth tuner positions are lower in the list.

In step 508, the first tuner position in the list is selected. Thus, the first tuner position 110 is selected. In step 510, the signal received by the first tuner position 110 is identified. For the purpose of describing this technology only, the signal received by the first tuner position 110 is MTV. In step 512, at least two of the television lineups will be eliminated. Two television lineups (first and fourth) designate MTV and two television lineups (second and third) designate ABC.

Figure 6:
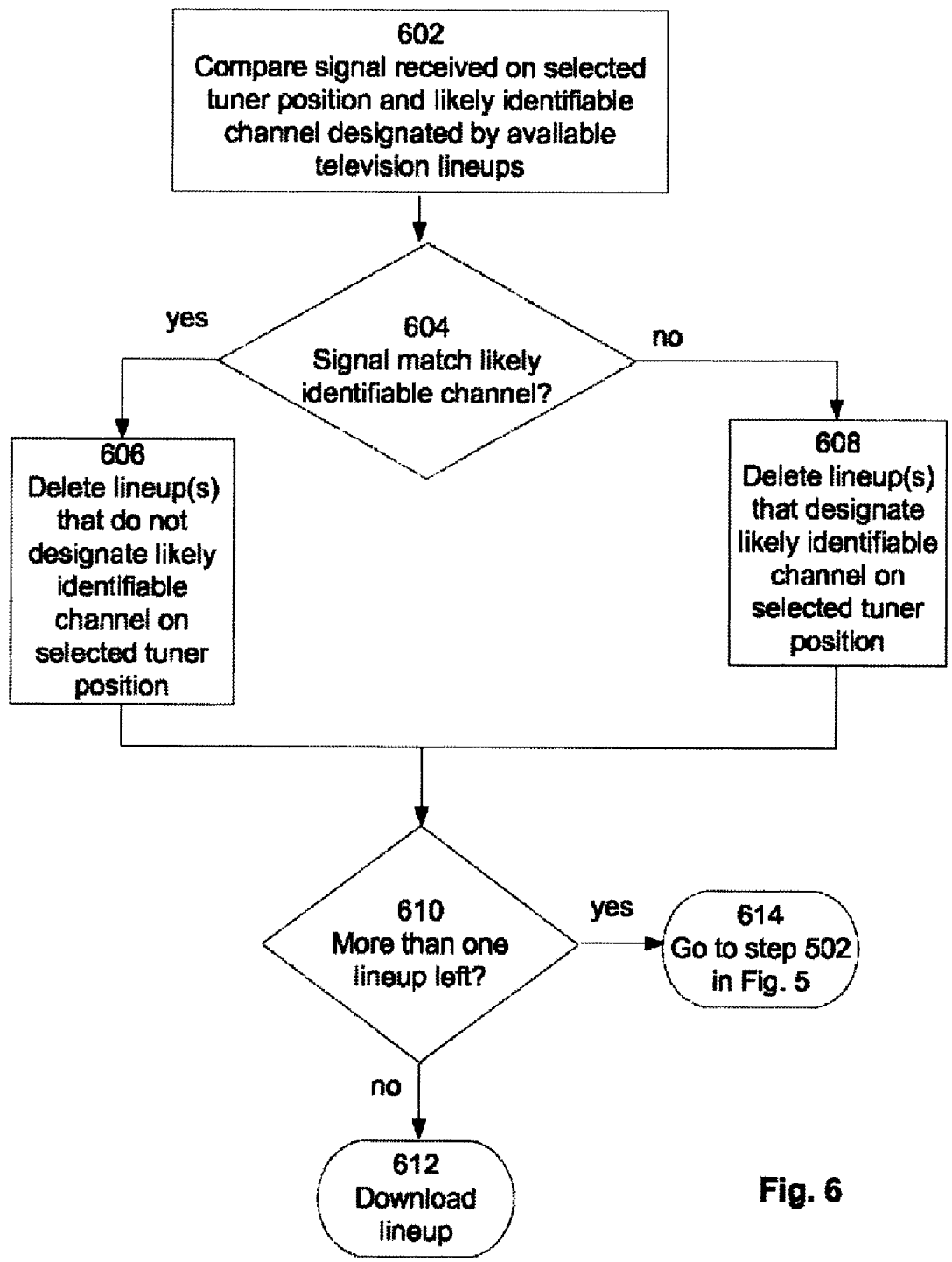
FIG. 6 depicts a flow diagram providing exemplary steps for eliminating television lineups based on the signal received by the tuner position.

FIG. 6 illustrates exemplary steps of step 512. In step 602, the channel received on the first tuner position 110 is compared to the likely identifiable channel designated by the first and fourth television lineups, MTV. In step 602, it is determined that the channel received by the first tuner position 110, MTV, is the same as the likely identifiable channel designated by the first and fourth television lineups.

In step 606, the television lineups that do not designate MTV for the first tuner position 110 are deleted. Thus, the second and third tuner positions are deleted. If the channel received by the first tuner position 110 was, for example, ABC, the first and fourth television lineups would be deleted, in step 608. In step 610, it is determined if more than one television lineup remains. In the example provided above, two television lineups remain at this point: the first television lineup 102 and the fourth television lineup 108. Thus, the available television lineups are identified in step 502 and steps 504-512 are repeated. If only one television lineup remained, the television lineup is downloaded to the digital device, in step 612.

Figure 7:
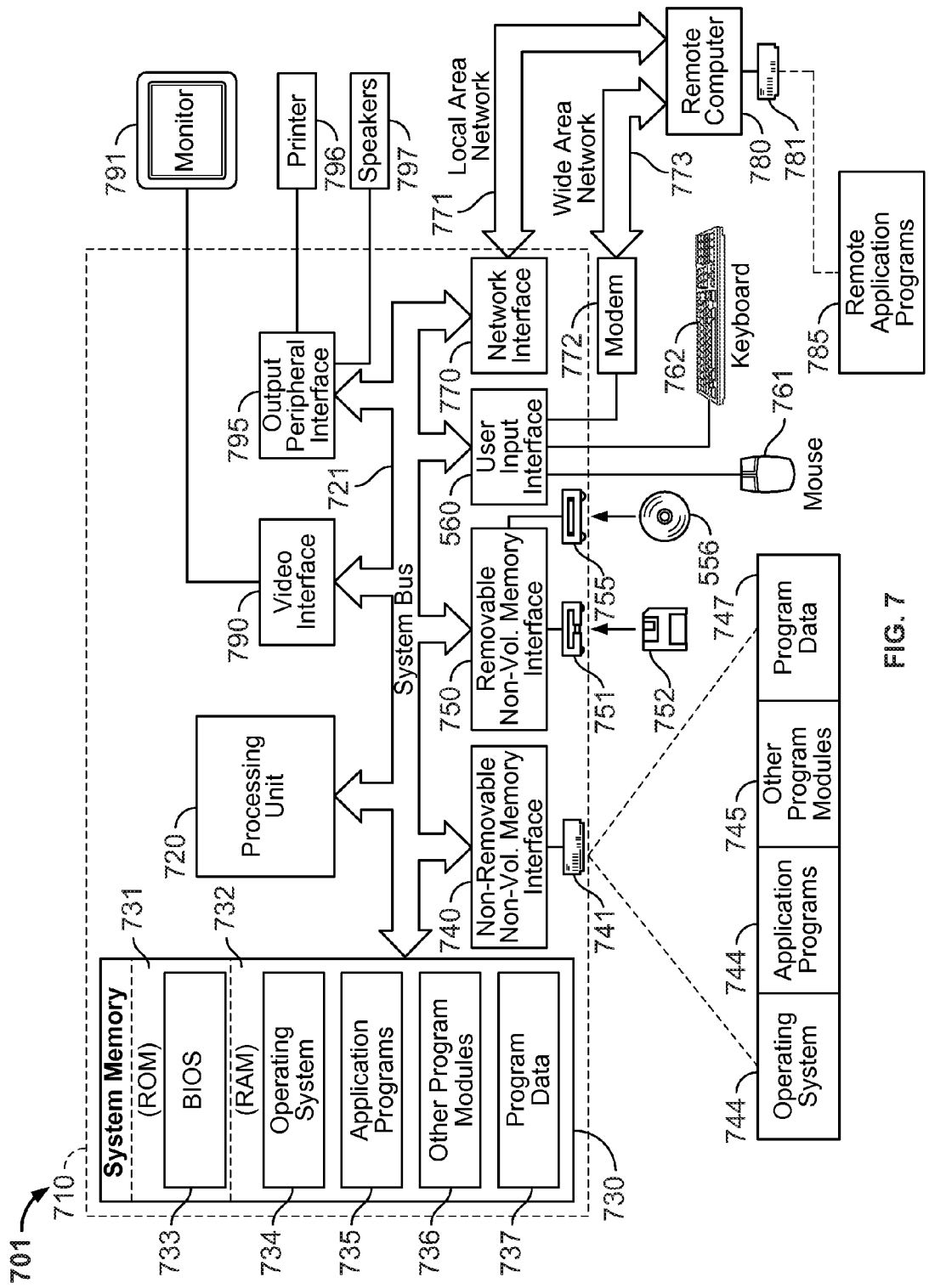
FIG. 7 depicts a block diagram of a computer system for performing the methods and generating the user interfaces described herein.

With reference to FIG. 7, an exemplary system for implementing the inventive system includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 may include a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes volatile and nonvolatile, as well as removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

The system memory 730 includes computer storage media in the form of volatile and/or nonvolatile memory such as ROM 731 and RAM 732. A basic input/output system (BIOS) 733, containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disc drive 741 that reads from or writes to non-removable, nonvolatile magnetic media and a magnetic disc drive 751 that reads from or writes to a removable, nonvolatile magnetic disc 752. Computer 710 may further include an optical media reading device 755 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 741 is typically connected to the system bus 721 through a non-removable memory interface such as interface 740. Magnetic disc drive 751 and optical media reading device 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disc drive 741 is illustrated as storing operating system 744, application programs 745, other program modules 746, and program data 747. These components can either be the same as or different from operating system 734, application programs 735, other program modules 736, and program data 737. Operating system 744, application programs 745, other program modules 746, and program data 747 are given different numbers here to illustrate that, at a minimum, they are different copies.

A user may enter commands and information into the computer 710 through input devices such as a keyboard 762 and a pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus 721, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 581 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communication over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communication link between the computers may be used.

Figure 8:
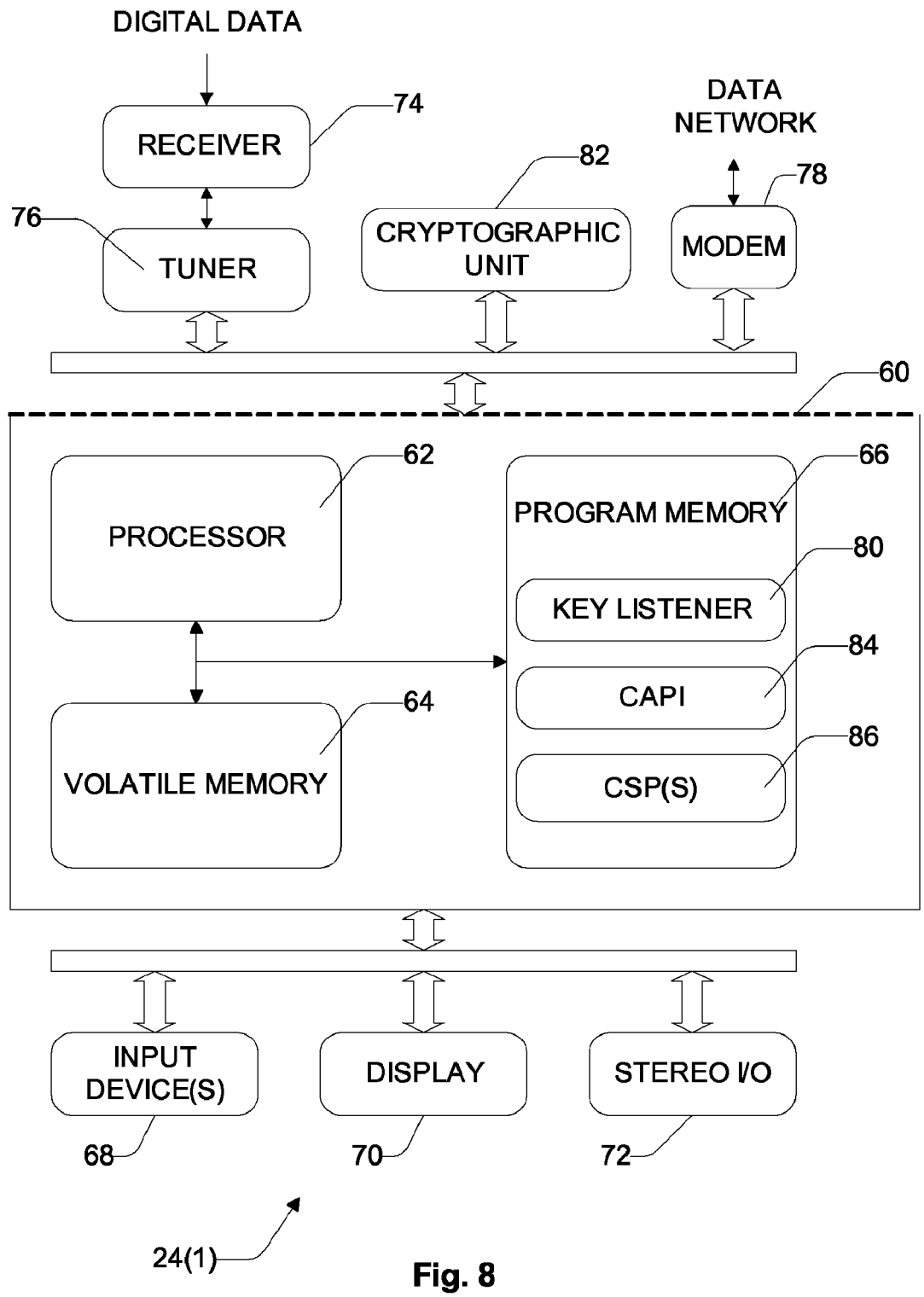
FIG. 8 depicts a block diagram of a set-top box for performing the methods.

FIG. 8 shows an exemplary configuration of an authorized client 24(1) implemented as a broadcast-enabled computer. It includes a central processing unit 60 having a processor 62, volatile memory 64 (e.g., RAM), and program memory 66 (e.g., ROM, Flash, disk drive, floppy disk drive, CD-ROM, etc.). The client 24(1) has one or more input devices 68 (e.g., keyboard, mouse, etc.), a computer display 70 (e.g., VGA, SVGA), and a stereo I/O 72 for interfacing with a stereo system.

The client 24(1) includes a digital broadcast receiver 74 (e.g., satellite dish receiver, RF receiver, microwave receiver, multicast listener, etc.) and a tuner 76 which tunes to appropriate frequencies or addresses of the broadcast network. The tuner 76 is configured to receive digital broadcast data in a particularized format, such as MPEG-encoded digital video and audio data, as well as digital data in many different forms, including software programs and programming information in the form of data files. The client 24(1) also has a modem 78 which provides dial-up access to the data network 28 to provide a back channel or direct link to the content servers 22. In other implementations of a back channel, the modem 78 might be replaced by a network card, or an RF receiver, or other type of port/receiver which provides access to the back channel.

The client 24(1) runs an operating system which supports multiple applications. The operating system is preferably a multitasking operating system which allows simultaneous execution of multiple applications. The operating system employs a graphical user interface windowing environment which presents the applications or documents in specially delineated areas of the display screen called "windows." One preferred operating system is a Windows® brand operating system sold by Microsoft Corporation, such as Windows® 95 or Windows® NT or other derivative versions of Windows®. It is noted, however, that other operating systems which provide windowing environments may be employed, such as the Macintosh operating system from Apple Computer, Inc. and the OS/2 operating system from IBM.

The client 24(1) is illustrated with a key listener 80 to receive the authorization and session keys transmitted from the server. The keys received by listener 80 are used by the cryptographic security services implemented at the client to enable decryption of the session keys and data. Cryptographic services are implemented through a combination of hardware and software. A secure, tamper-resistant hardware unit 82 is provided external to the CPU 60 and two software layers 84, 86 executing on the processor 62 are used to facilitate access to the resources on the cryptographic hardware 82.

The software layers include a cryptographic application program interface (CAPI) 84 which provides functionality to any application seeking cryptographic services (e.g., encryption, decryption, signing, or verification). One or more cryptographic service providers (CSPs) 86 implement the functionality presented by the CAPI to the application. The CAPI layer 84 selects the appropriate CSP for performing the requested cryptographic function. The CSPs 86 perform various cryptographic functions such as encryption key management, encryption/decryption services, hashing routines, digital signing, and authentication tasks in conjunction with the cryptographic unit 82. A different CSP might be configured to handle specific functions, such as encryption, decryption, signing, etc., although a single CSP can be implemented to handle them all. The CSPs 86 can be implemented as dynamic linked libraries (DLLs) that are loaded on demand by the CAPI, and which can then be called by an application through the CAPI 84.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for selecting a television lineup for viewing on a digital device, comprising:
   (a) identifying available television lineups capable of being viewed on the digital device, each available television lineup includes a plurality of tuner positions;
   (b) selecting one of the plurality of tuner positions;
   (c) for the tuner position selected in step (b), identifying a television channel designated in each available television lineup identified in step (a);
   (d) determining if one of the television channels identified in step (c) is a likely identifiable channel on the tuner position selected in step (b), said likely identifiable channel comprises a channel carrying in-band data;
(e) calculating a percentage of the available television lineups identified in step (a) that designate the likely identifiable channel on the tuner position selected in step (b);
(f) if the likely identifiable channel is identified in approximately half of the available television lineups identified in step (a), identifying a channel received by the digital device on the tuner position selected in step (b);
(g) if the channel received by the digital device is the likely identifiable channel, deleting each available television lineup that does not designate the likely identifiable channel on the tuner position selected in step (b);
(h) if the channel received by the digital device is not the likely identifiable channel, deleting each available lineup that designates the likely identifiable channel on the tuner position selected in step (b); and
(j) if more than one available television lineup remains, repeating steps (a)-(h) until one available television lineup remains.

2. The method as recited in claim 1, further comprising the step of:
(k) downloading the one remaining available television lineup to the digital device.

3. The method as recited in claim 1, wherein step (a) of identifying available television lineups comprises the step of identifying all available television lineups according to postal code.

4. The method as recited in claim 1, wherein step (a) of identifying available television lineups comprises the steps of:
(i) identifying all available television lineups capable of being received by the digital device within a predetermined postal code; and
(ii) downloading each available television lineup identified in step (a)(i).

5. The method as recited in claim 1, wherein step (f) of identifying the channel received by the digital device on the tuner position selected in step (b) comprises the step of identifying the channel received by the digital device on the tuner position selected in step (b) by one of the following: a watermark, in-band data, and content.

6. The method as recited in claim 1, wherein step (f) of identifying the channel received by the digital device on the tuner position selected in step (b) comprises the step of:
if the likely identifiable channel is identified in forty to sixty percent of the available television lineups, determining the channel received by the digital device on the tuner position selected in step (b).

7. The method as recited in claim 1, wherein step (j) of repeating steps (a)-(h) until one available television lineup remains comprises the steps of:
(i) repeating steps (a)-(h) as long a new tuner position may be selected in step (b); and
(ii) otherwise if no additional tuner positions are available for selecting, prompting a viewer to identify the channel received by the digital device on the tuner position selected in step (b).

8. The method as recited in claim 7, wherein step (j)(ii) of prompting a viewer to identify the channel received by the digital device on the tuner position selected in step (b) comprises the steps of:
(A) presenting the viewer with a user interface that displays the channel received by the digital device on the tuner position selected in step (b);
(B) requesting the viewer to identify the channel displayed in the user interface;
(C) receiving a response from the viewer; and
(D) deleting available television lineups based on the response received from the viewer in step (j)(ii)(C).

9. A method for selecting a television lineup, comprising the steps of:
(a) identifying available television lineups capable of being viewed on a digital device, each available television lineup includes a plurality of tuner positions;
(b) selecting one of the plurality of tuner positions;
(c) for the tuner position selected in step (b), identifying television channels designated in each available television lineup identified in step (a);
(d) if any of the television channels identified in step (c) is a likely identifiable channel that contains in-band data and a percentage of the available television lineups identified in step (a) that designate the likely identifiable channel on the tuner position selected in step (b) is within a range of acceptable percentage:
(i) identifying a channel received by the digital device on the tuner position selected in step (b);
(ii) deleting each available lineup that does not designate the channel identified in step (d)(i) for the tuner position selected in step (b);
(iii) if more than one television lineup remains after step (d)(ii), returning to step (a);
(e) if any of the television channels identified in step (c) is the likely identifiable channel but the percentage of the available television lineups identified in step (a) that designate the likely identifiable channel for the tuner position selected in step (b) is not within the range of acceptable percentage, returning to step (b) and selecting another tuner position.

10. The method as recited in claim 9, wherein step (a) of identifying available television lineups capable of being viewed on the digital device comprises the step of downloading available television lineups capable of being viewed in the digital device.

11. The method as recited in claim 10, wherein step (a) of identifying available television lineups capable of being viewed on the digital device comprises the step of downloading television lineups available within a specific postal code.

12. The method as recited in claim 9, wherein step (d)(i) of identifying the channel received by the digital device on the tuner position selected in step (b) comprises the step of identifying the channel by one of the following: in-band data, watermark or content.

13. The method as recited in claim 9, wherein step (e) of returning to step (b) comprises the steps of:
if additional tuner positions are available for selecting, returning to step (b) and selecting one of the available tuner positions; and
if no additional tuner positions are available for selecting, prompting a viewer to identify the channel received by the digital device on the tuner position selected in step (b).

14. The method as recited in claim 13, wherein step (e)(ii) of prompting a viewer to identify the channel received by the digital device on the tuner position selected in step (b) comprises the steps of:
(D) presenting the viewer with a user interface that displays the channel received by the digital device on the tuner position selected in step (b);
(E) requesting the viewer to identify the channel displayed in the user interface;
(F) receiving a response from the viewer; and
(G) deleting available lineups based on the response received from the viewer in step (e)(ii)(F).

15. A method for selecting a television lineup, comprising:
(a) obtaining available television lineups, each available television lineup includes a plurality of tuner positions;
(b) determining the differences between the available television lineups obtained in step (a) for each tuner position, said determining the differences between the available television lineups for each tuner position comprises:
   (i) identifying a channel designated by each available television lineup for each said tuner position;
   (ii) determining if the channel identified in step (b)(i) for each said tuner position is a likely identifiable channel; and
   (iii) determining a percentage of the available television lineups that designated the likely identifiable channel for each said tuner position;
(c) ranking each of the plurality of tuner positions based on the channel identified in step (b)(i) for each said tuner position and the percentage of the available television lineups that designate the likely identifiable channel for each said tuner position;
(d) selecting one of the plurality of tuner positions according to said ranking in step (c);
(e) identifying a channel received by the tuner position selected in step (d); and
(f) deleting at least one available television lineup based on the channel identified in step (e) and the likely identifiable channel designated by at least one of the available television lineups.

16. The method as recited in claim 15, wherein step (c) of ranking the tuner positions comprises the steps of:
   (i) ranking tuner positions with at least one available television lineup designating the likely identifiable channel higher than tuner positions with no available television lineups designating the likely identifiable channel; and
   (ii) of the tuner positions with at least one available television lineup designating the likely identifiable channel, sorting the tuner positions by percentage of available television lineups that designate the same likely identifiable channel such that a first tuner position with a first percentage of available television lineups that designate the same likely identifiable channel is ranker higher than a second tuner positions with a second percentage of available television lineups that designate the same likely identifiable channel, wherein the first percentage is higher than the second percentage.

17. The method as recited in claim 16, wherein step (c)(ii) of sorting the tuner positions by percentage of available television lineups that designate the same likely identifiable channel comprises the step of sorting the tuner positions according to tuner positions whereby as close to half of the available television lineups designate the same likely identifiable channel.

18. The method as recited in claim 15, wherein step (f) of deleting at least one available television lineup comprises the steps of:
   (i) if the channel identified in step (e) is not the likely identifiable channel designated by at least one of the available television lineups, deleting the available television lineups that designate the likely identifiable channel in the tuner position selected in step (d); and
   (ii) if the channel identified in step (e) is the likely identifiable channel designated by at least one of the available television lineups, deleting the available television lineups that do not designate the likely identifiable channel in the tuner position selected in step (d).

19. The method as recited in claim 16, wherein step (d) of selecting a tuner position comprises the step of selecting a tuner position in the order the tuner positions were sorted in step (c)(ii).

20. The method as recited in claim 9, wherein the range of acceptable percentage is between 40% and 60% of the available television lineups identified in step (a).

* * * * *